W. H. GILTNER.
ENGINE GOVERNOR ATTACHMENT.
APPLICATION FILED FEB. 16, 1909.
974,655.
Patented Nov. 1, 1910.
2 SHEETS—SHEET 1.
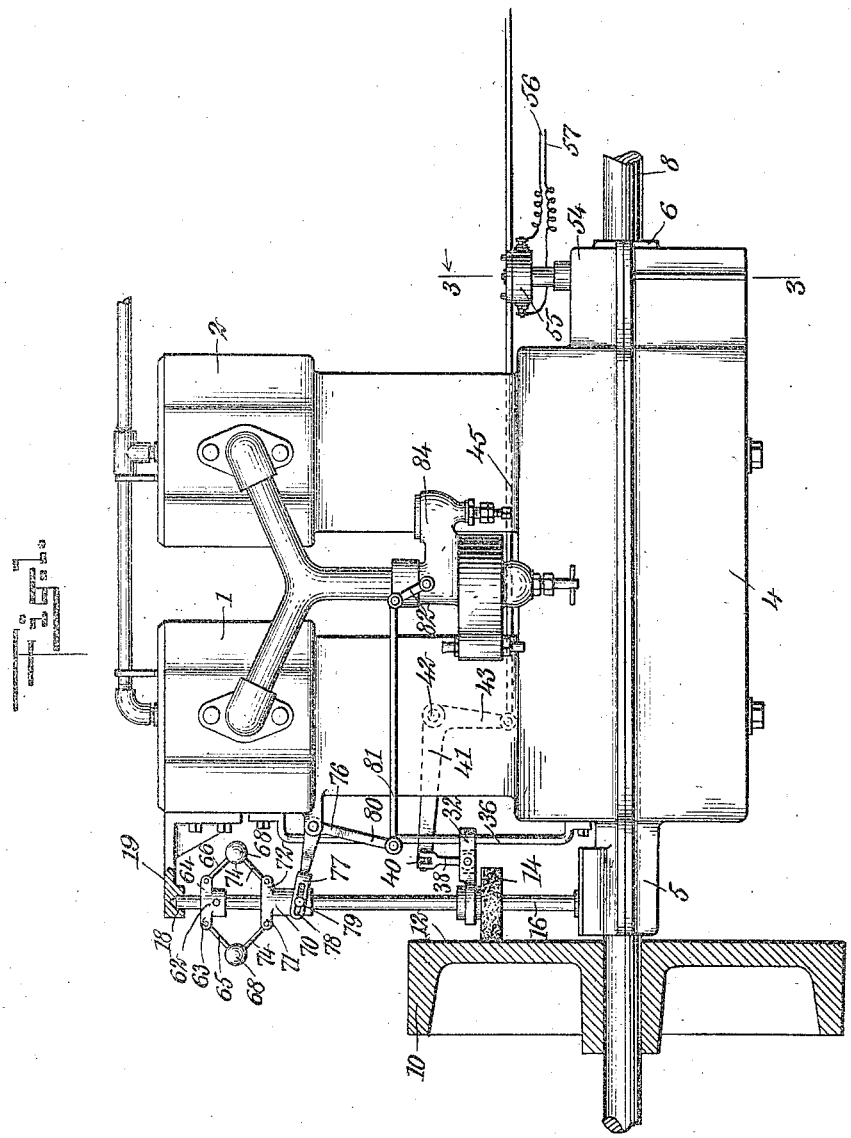
WITNESSES
INVENTOR
William H. Giltner
BY Munn & Co.
ATTORNEYS

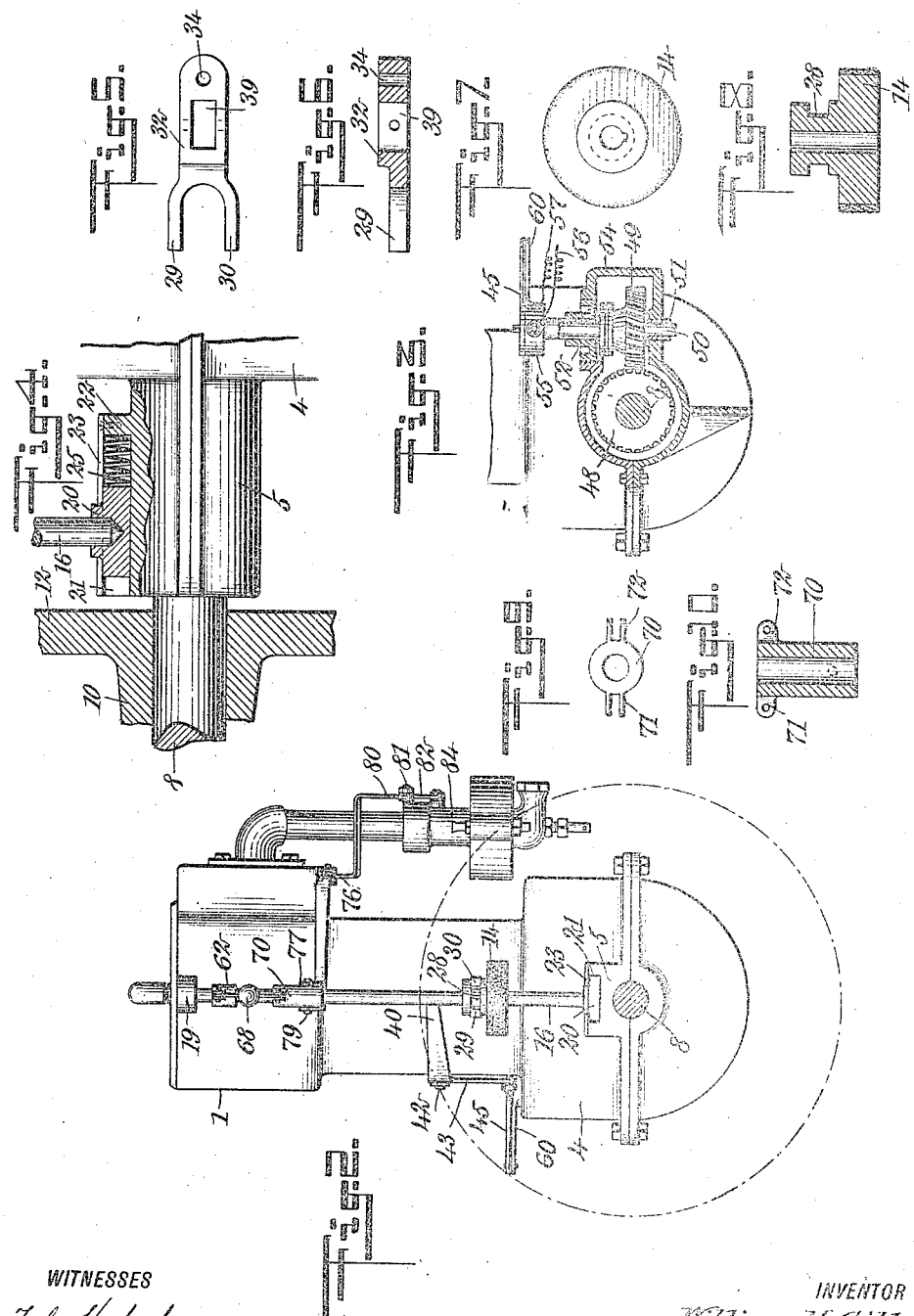

UNITED STATES PATENT OFFICE.

WILLIAM HILTON GILTNER, OF PARIS, KENTUCKY.

ENGINE-GOVERNOR ATTACHMENT.

974,655.

Specification of Letters Patent.  Patented Nov. 1, 1910.

Application filed February 16, 1909. Serial No. 478,242.

*To all whom it may concern:*

Be it known that I, WILLIAM H. GILTNER, a citizen of the United States, and a resident of Paris, in the county of Bourbon and State of Kentucky, have invented a new and Improved Engine-Governor Attachment, of which the following is a full, clear, and exact description.

This invention relates to means for varying the speed of an engine, together with means for simultaneously controlling the spark-timer.

One object of the invention is to provide means for varying the speed of an engine with relation to that of the governor by which it is normally controlled, so that without changing the speed of the governor, that of the engine may be varied within certain limits.

A further object is to provide means whereby the time of the production of the igniting spark, may be controlled simultaneously with the varying of the speed of the engine.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of a convenient form of internal combustion engine with my invention applied thereto; Fig. 2 is an end elevation of the same, viewed from the left-hand end of Fig. 1, the fly-wheel being removed; Fig. 3 is a vertical section, taken on the line 3—3 in Fig. 1; Fig. 4 is a fragmentary sectional view, on an enlarged scale, of the adjustable bearing supporting one end of the friction wheel shaft; Fig. 5 is a plan view of the yoke for moving the friction wheel along its shaft; Fig. 6 is a longitudinal central section of said yoke; Fig. 7 is a plan view of the friction wheel; Fig. 8 is a central vertical section through said wheel; Fig. 9 is a plan view of the sleeve which supports the governor upon its shaft; and Fig. 10 is a central vertical section through said sleeve.

In its present embodiment, the invention is shown as applied to an internal combustion engine having two cylinders 1 and 2 mounted above a crank-pit casing 4 having bearings 5 and 6 at its ends, in which a main or driving shaft 8 is journaled. A fly-wheel 10 is secured to rotate with the main shaft 8 and is formed with a face 12, which is flat and adapted to co-act with a friction wheel 14, which is slidably mounted about a shaft 16. Said shaft 16 is journaled at its upper end to rotate in a bearing 18 formed on a bracket 19 secured to the engine cylinder 1. The lower end of the shaft 16 is journaled to rotate in a bearing 20, which is slidably mounted in a groove 21 formed in the upper side of the bearing 5. Said groove 21 is open at one end but closed at the other by means of a web 22. A plate 23 is secured to the upper side of the walls of the groove 21, in order to retain the bearing 20 in proper position in said groove. A spring 25 is also mounted within the groove 21 between the bearing 20 and the web 22. Said spring 25 tends to maintain the friction wheel 14 in contact with the face 12 of the fly-wheel 10.

The friction wheel 14 has its periphery covered with a suitable material, such as leather, for frictionally engaging the surface 12 of the fly-wheel 10. Said wheel is formed with an annular groove 28, which receives the arms 29 and 30 of a yoke 32. Said yoke 32 is provided with a hole 34 for the reception of a guide-rod 36, which is secured at one end to the cylinder 1 and at its other end to the crank-pin casing 4.

A link 38 is pivotally mounted at one end within a slot 39 formed in the yoke 32. The other end of the link 38 is pivotally connected to one end 40 of a bell-crank lever 41, which is pivotally mounted about a stud 42 projecting from the engine frame below the cylinder 1. The end 43 of the bell-crank 41 is pivotally connected to a rod 45, which extends to any suitable location from which the engine is to be manually controlled.

A gear 46 is mounted to rotate with the shaft 8 and meshes with a gear 49 secured to a shaft 50 journaled in bearings 51 and 52, which are supported in a casing 54 forming an extension of the crank-pit casing 4. Mounted to rotate with the shaft 50 and inclosed within a casing 55 is a spark-timer, which may be of ordinary construction. Said spark-timer controls an electric circuit connected to wires 56 and 57. An arm 60 extends laterally from the casing 55, and is pivotally connected to the rod 45. By moving the rod 45, it will be seen that the arm 60 is oscillated, and through the agency of the bell-crank 41, link 38 and yoke 32, the friction wheel 14 is reciprocated along the shaft 16. Thus the spark-timer and the rate of rotation of the shaft 16 are varied simultaneously.

Pinned to the shaft 16 is a sleeve 62 having laterally projecting ears 63 and 64, to which are pivoted arms 65 and 66, which are connected with the balls 68 of any suitable form of governor. A sleeve 70 is slidably mounted upon the shaft 16 and provided with laterally extending ears 71 and 72, to which arms 74 are pivotally connected, said arms being also connected to the governor balls 68.

Pivotally mounted upon the engine frame below the cylinder 1 is a bell-crank 76, having one end 77 provided with an elongated slot 78, which receives a pin 79 secured in the sleeve 70. The end 80 of the bell-crank lever 76 is pivotally connected to a link 81, said link being also pivotally connected to an arm 82, which operates a throttle within a carbureter 84.

As the speed of the governor varies, the bell-crank 76 will be oscillated, which thereby controls the throttle within the carbureter 84.

From the construction above set forth, it will be seen that the friction wheel 14 may be manually controlled to occupy such a position with respect to the surface 12 on the fly wheel 10, as to give the engine any desired speed, while the governor rotates at substantially constant speed, or a little above or below its normal speed, the spark timer being simultaneously adjusted to the speed of the engine. For example, say a governor is being used that acts on the throttle mechanism at a speed of 800 revolutions per minute and that at 850 revolutions per minute the throttle closes entirely or remains wide open at 750 revolutions per minute. Then if friction wheel 14 were 4 inches in diameter and occupied a position 2 inches from the axis of the surface 12, the engine would maintain a speed of 800 revolutions per minute. If the position of the friction wheel 14 were shifted to a position on the surface 12, 4 inches from its axis, the governor would by reason of being driven above its normal speed, close the throttle, and the speed of the engine would be reduced to 400 revolutions per minute. The governor would again rotate at a speed of 800 revolutions per minute, and would thereby hold the engine at a speed of 400 revolutions per minute. At the same time, the time of ignition would be simultaneously adjusted, with proper relation to the speed of the engine.

Having thus described my invention, I claim as new and desire to secure by Letters Patent:—

1. The combination with the engine and the main shaft, of a fly wheel on the main shaft having a friction face, a vertical shaft, a fixed bearing in which the upper end of the shaft is journaled, a slidable bearing in which the lower end of the shaft is journaled, a friction wheel slidable on the vertical shaft and coöperating with the friction face of the fly wheel, a spring normally pressing the bearing away from the fly wheel, means for limiting the outward movement of the bearing, a yoke engaging the friction wheel, a guide rod for the yoke, means for moving the yoke, a spark timer, a connection and between the yoke moving means, and the spark timer, a throttle, a governor operated by the vertical shaft, a connection between the governor and the throttle.

2. In combination with the engine and the main shaft, a governor shaft, a governor driven by the shaft, a driving connection between the main shaft and the governor shaft, means in connection with the driving connection for varying the relative speed of the governor shaft with respect to the main shaft, a spark timer for the engine, a connection between said means and the spark timer, a throttle for the engine, and a connection between the governor and the throttle.

In testimony whereof I have signed my name to this specification in the presence of two subscribing witnesses.

WILLIAM HILTON GILTNER.

Witnesses:
A. S. THOMPSON,
C. J. LANCASTER.